(12) United States Patent
Lu

(10) Patent No.: US 10,532,782 B2
(45) Date of Patent: Jan. 14, 2020

(54) MULTI-LEGGED INDEPENDENT MOBILE CARRIER

(71) Applicant: Renhang Lu, Shenzhen (CN)

(72) Inventor: Renhang Lu, Shenzhen (CN)

( * ) Notice: Subject to any disclaimer, the term of this patent is extended or adjusted under 35 U.S.C. 154(b) by 0 days.

(21) Appl. No.: 16/329,686

(22) PCT Filed: Aug. 30, 2017

(86) PCT No.: PCT/CN2017/099555
§ 371 (c)(1),
(2) Date: Feb. 28, 2019

(87) PCT Pub. No.: WO2018/041113
PCT Pub. Date: Mar. 8, 2018

(65) Prior Publication Data
US 2019/0193798 A1    Jun. 27, 2019

(30) Foreign Application Priority Data

Aug. 30, 2016    (CN) .......................... 2016 1 0776612

(51) Int. Cl.
*B62D 57/028*    (2006.01)
*B62D 57/032*    (2006.01)
*B62D 5/02*    (2006.01)

(52) U.S. Cl.
CPC ............. *B62D 57/028* (2013.01); *B62D 5/02* (2013.01); *B62D 57/032* (2013.01)

(58) Field of Classification Search
CPC .... B62D 57/02; B62D 57/028; B62D 57/032; B62B 5/026; B62B 5/0043; A61G 5/065
See application file for complete search history.

(56) References Cited

U.S. PATENT DOCUMENTS

| 2,400,824 A | 5/1946 | Jackson |
| 5,423,708 A | 6/1995 | Allen |
| (Continued) | | |

FOREIGN PATENT DOCUMENTS

| CN | 2397015 Y | 9/2000 |
| CN | 2566824 Y | 8/2003 |
| (Continued) | | |

*Primary Examiner* — Kevin Hurley
(74) *Attorney, Agent, or Firm* — Muncy, Geissler, Olds & Lowe, P.C.

(57) ABSTRACT

A multi-leg independent mobile carrier device, comprising: a base (1), a traveling mechanism (2), and a posture adjustment mechanism (3). The base (1) is used for carrying a human being or an object. The traveling mechanism (2) comprises a driving unit (21) connected to the base (1) and a connecting rod unit (22) rotatably connected to the driving unit. The traveling mechanism (2) is used for driving the base (1) to travel and get over any obstacles. The posture adjustment mechanism (3) is connected to the base (1) and used for keeping the human being or object balanced. The multi-leg independent mobile carrier device integrates a traveling mechanism and a posture adjustment mechanism. The posture adjustment mechanism is used for keeping the base balanced all the time and the traveling mechanism is used for driving the entire device to travel and turn around more flexibly. Therefore, the technical problem of a carrier device being unable to satisfy requirements of good obstacle performance, comfortable riding experience, and flexible traveling is effectively solved. The obstacle crossing ability of the multi-leg independent mobile carrier device is enhanced, and user experience is improved.

16 Claims, 17 Drawing Sheets

(56) References Cited

U.S. PATENT DOCUMENTS

| | | | | |
|---|---|---|---|---|
| 5,929,585 A * | 7/1999 | Fujita | .................... | B62D 57/032 |
| | | | | 318/568.11 |
| 9,499,219 B1 * | 11/2016 | Jackowski | ............. | B25J 9/1694 |
| 10,189,519 B2 * | 1/2019 | Hurst | .................... | B62D 57/032 |
| 2008/0109115 A1 * | 5/2008 | Lim | ..................... | B62D 57/032 |
| | | | | 700/258 |
| 2019/0118881 A1 * | 4/2019 | McGinn | ............... | B62D 57/024 |

FOREIGN PATENT DOCUMENTS

| | | |
|---|---|---|
| CN | 202130526 U | 2/2012 |
| CN | 102837752 A | 12/2012 |
| CN | 103171645 A | 6/2013 |
| CN | 103693123 A | 4/2014 |
| CN | 203937758 U | 11/2014 |
| CN | 204184413 U | 3/2015 |
| CN | 105216899 A | 1/2016 |
| CN | 105711677 A | 6/2016 |
| CN | 106428284 A | 2/2017 |
| CN | 206086954 U | 4/2017 |
| EP | 2 870 953 A1 | 5/2015 |

* cited by examiner

MULTI-LEGGED INDEPENDENT MOBILE CARRIER

FIELD OF THE INVENTION

The present application falls into the technical field of carrier. More specifically, it relates to a multi-leg independent mobile carrier device.

Background Art

The carrier refers to a transport device for carrying people or objects. Especially, it is a convenient tool assisting people with mobility difficulties, the aged and the people with lower limb disability in walking. Traditional carriers, however, are only suitable for walking on flat grounds or slopes since they have no stairs climbing or obstacle crossing function. The application ranges of such carriers are greatly restricted since steps, stairs, or ditches may be frequently encountered in living environment.

To solve the aforementioned problems, some carriers with functions such as climbing stairs and steps have now emerged on the market. They generally employ a planetary wheel type or crawler type movement mechanism. Most planetary wheel type movement mechanisms, however, present defects such as uncertain obstacle crossing ability, poor stability due to great fluctuation in obstacle crossing process. Compared with planetary wheel type movement mechanisms, in spite of a better stability, crawler type movement mechanisms have defects such as high resistance, low running speed, poor obstacle crossing ability due to the low chassis and insufficiently flexible steering. Therefore, neither of the above two structures can satisfy the requirements of strong obstacle crossing ability, comfortable riding and flexible moving.

Technical Problems

The present application is to provide a multi-leg independent mobile carrier device to solve the technical problems of existing carriers with available technologies in satisfying the requirements of strong obstacle crossing ability, comfortable riding and flexible moving.

Technical Solution

This application presents a multi-leg independent mobile carrier device comprising:
a base for carrying people or objects;
a travelling mechanism for driving the base to move over and cross an obstacle; said travelling mechanism comprises a driving unit coupled to the base, and a rotatable connecting rod unit coupled to the driving unit;
a posture adjustment mechanism coupled to the base; said posture adjustment mechanism is configured to maintain the person or object in a balanced state.
Furthermore, the posture adjustment mechanism comprising:
a 1st supporting assembly composed of the 1st driving member, a 2nd driving member which can be rotatably coupled to the 1st driving member, a 1st telescopic rod which can be telescopically coupled to the 2nd driving member with one end stretching out the 2nd driving member, and a 3rd driving member which can be rotatably coupled to the extension end of the 1st telescopic rod; the 3rd driving member is coupled to the driving unit.
Furthermore, the 1st supporting assembly comprising:
a 11th driving member for connecting the 1st and the 2nd driving members.
Furthermore, the posture adjustment mechanism comprising:
a 2nd supporting assembly composed of a 4th driving member, a 5th driving member, a 2nd telescopic rod, a 3rd telescopic rod and a 1st adapting piece; one end of the 4th driving member is hinged to the base; one end of the 5th driving member is hinged to the base; the 2nd telescopic rod can be telescopically coupled to the 4th driving member, and the extension end stretches out from the other end of the 4th driving member; the 3rd telescopic rod can be telescopically coupled to the driving member, and the extension end stretches out from the other end of the 5th driving member; one side of the 1st adapting piece is hinged to the extension end of the 2nd and the 3rd telescopic rods; the other side of the 1st adapting piece is coupled to the driving unit.
Furthermore, the travelling mechanism comprising:
wheels located on one side of the driving unit and are drivingly coupled to the driving unit.
Furthermore, the posture adjustment mechanism comprising:
a 1st bracket firmly fixed to the base;
a 3rd supporting assembly which rotatably coupled to the 1st bracket.
Furthermore, the travelling mechanism consists of three wheels, two of which are rotatably coupled to opposite sides of the base and are drivingly connected to the driving unit respectively; the 3rd supporting assembly comprises of a 6th driving member which rotatably coupled to the 1st bracket; a 7th driving member coupled to the 6th driving member and a 4th telescopic rod telescopically coupled to the 7th driving member with one end stretching out the 7th driving member; the remaining wheel is rotatably coupled to the extension end of the 4th telescopic rod.
Furthermore, the posture adjustment mechanism comprising:
a lifting component setting inside the 1st bracket and flexibly coupled to the 6th driving member.
Furthermore, the travelling mechanism consists of wheels of integral multiple of two; the integral multiple is greater than one time; the wheels of integral multiple of two are rotatably coupled to two opposite sides of the base in symmetry; the wheels are drivingly coupled to the driving unit; the multi-leg independent mobile carrier device consists of a loading table for carrying a person or object; the 3rd supporting assembly consists of the 6th driving member which rotatably coupled to the 1st bracket; the 6th driving member is coupled to the loading table.
Furthermore, the said driving unit comprising:
a 8th driving member for driving the connecting rod unit to move;
a steering member coupled to the 8th drive member; the steering member is to change the advancing direction of the multi-leg independent mobile carrier device.
Furthermore, the connecting rod unit comprising:
a connecting rod group with feet contacting the ground or the stepped surface at the end; the connecting rod group consists of several connecting rods which rotatably coupled to one side of the 8th driving member without interference on overlapping.
Furthermore, the connecting rod unit comprising:
a connecting rod group with feet contacting the ground or the stepped surface at the end; the connecting rod group consists of several connecting rods which rotatably coupled to two opposite sides of the 8th driving member without interference on overlapping.

Furthermore, the connecting rod unit comprising:

a connecting shaft group for connecting the connecting rod group and the 8th driving member; the connecting shaft group consists of a 1st connecting shaft connecting the 8th driving member and the connecting rod, and a 2nd connecting shaft connecting two adjacent said connecting rods.

Furthermore, central axes of the 1st and the 2nd connecting shafts are coincident or in parallel or at certain angle.

Furthermore, the multi-leg independent mobile carrier device comprising:

a detecting mechanism comprising a 2nd bracket setting at the front side of the base, a length detecting device for measuring step length, and a height detecting device for measuring step height; one end of the 2nd bracket is flexibly coupled to the base; the other end of the 2nd bracket is connected to the length detecting device and the height detecting device.

Furthermore, the detecting mechanism comprising:

a coupling component for making the 2nd bracket rotate and stretch relative to the base; one end of the coupling component is firmly coupled to the base; and the other end of the coupling component is firmly coupled to the 2nd bracket.

Beneficial Effects

The multi-leg independent mobile carrier device provided by the present application shows the following beneficial effects: It combines a travelling mechanism and posture adjustment mechanism. The later one always keep the base in balance, and the former one enables the whole device move and steer more flexibly thus to effectively resolve the technological difficulties of traditional carriers such as failure to meet the requirements of strong obstacle crossing ability, comfortable riding and flexible moving. The combination has improved the obstacle crossing ability of the multi-leg independent mobile carrier device and enhanced the user experience.

DESCRIPTION OF THE DRAWINGS

In order to more clearly illustrate the technical solutions in the embodiments of the present application, the drawings used in the embodiments or description of existing technologies are briefly described below. Notably, the drawings in the described below are only some embodiments of the present application. Ordinary technicians in this field can get more based on these drawings requiring no further creativity or labor.

Figure 1:
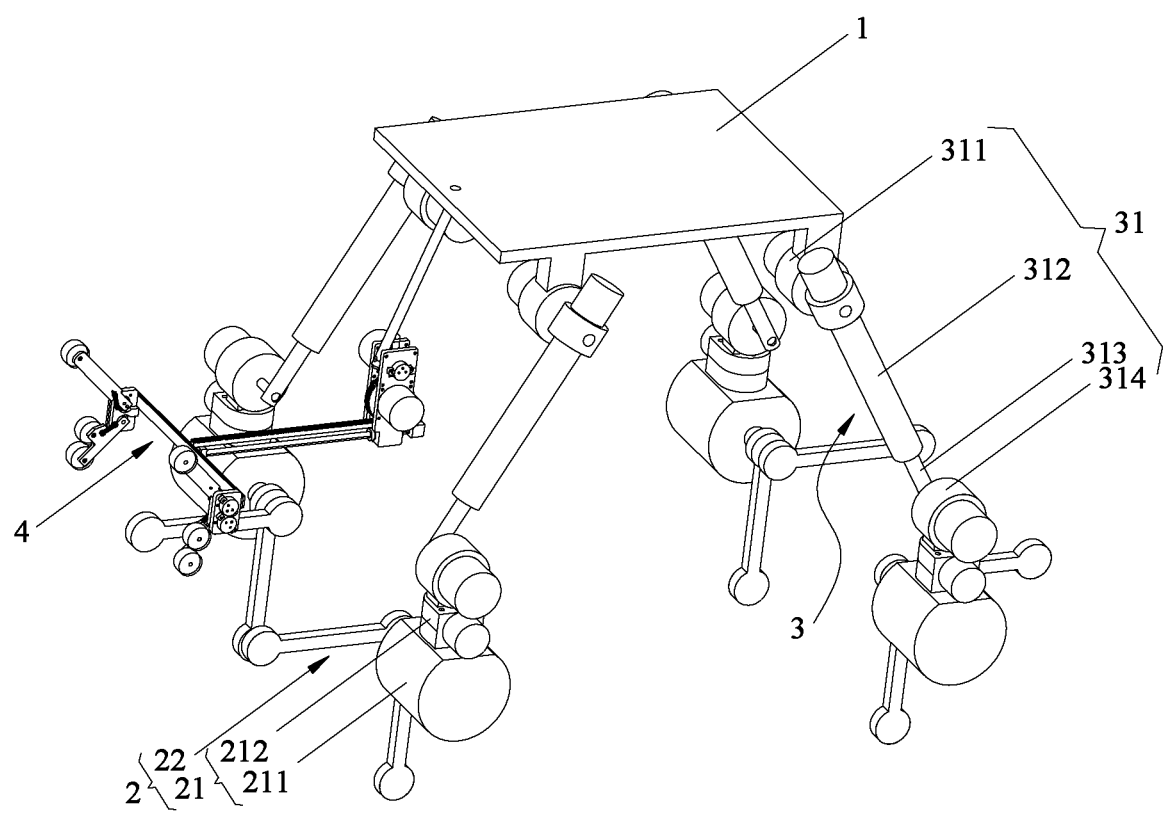
FIG. 1 is the stereogram of the multi-leg independent mobile carrier device presented in the embodiment 1.

Among them, attached diagram marks are as follows:

1—base, 2—travelling mechanism, 3—posture adjustment mechanism, 4—detecting mechanism, 5—loading table, 21—driving unit, 22—connecting rod unit, 23—wheel, 31—the 1st supporting assembly, 32—the 2nd supporting assembly, 33—the 1st bracket, 34—the 3rd supporting assembly, 35—lifting component, 41—the 2nd bracket, 42—length detecting device, 43—height detecting device, 44—connecting assembly, 211—the 8th driving member, 212—steering member, 221—connecting rod group, 222—connecting shaft group, 311—the 1st driving member, 312—the 2nd driving member, 313—the 1st telescopic rod, 314—the 3rd driving member, 321—the 4th driving member, 322—the 5th driving member, 323—the 2nd telescopic rod, 324—the 3rd telescopic rod, 325—the 1st adapting piece, 330—receiving groove, 341—the 6th driving member, 342—the 7th driving member, 343—the 4th telescopic rod, 351—limiting rod, 352—sliding block, 421—the 1st position sensor, 422—the 1st detecting rod, 423—the 1st trolley, 424—the 1st elastic member, 431—the 2nd position sensor, 432—the 2nd detector rod, 433—the 2nd trolley, 434—the 3rd trolley, 435—the 2nd elastic member, 441—connecting body, 442—the 9th driving member, 443—the 5th telescopic rod, 444—the 10th driving member, 445—the 2nd connecting member, 2210, 2210'—foot, 2211—the 1st connecting rod, 2212—the 2nd connecting rod, 2213—the 3rd connecting rod, 2214—the 4th connecting rod, 2221—the 1st connecting shaft, 2222—the 2nd connecting shaft.

EXECUTION MODE OF THE INVENTION

In order to clarify the technical difficulties to be solved, technical solution and beneficial effects of the present application, the present application is further described in detail below by combining the attached drawings and embodiments. It should be understood that the specific embodiments described herein are merely illustrative but not intended to be limiting to the present application.

Note that when an element is referred to as being "fixed" or "set" to another element, it can be directly or indirectly attached on the other element. When an element is referred to as being "connected" to another element, it can be directly or indirectly connected to the other element.

It should be understood that the directions or positional relations indicated by the terms "length", "width", "upper", "lower", "front", "back", "left", "right", "vertical", "horizontal", "top", "bottom", etc. are based on the attached drawings. They merely help to describe the present application and simplify description but not indicate or imply the specific orientation of the indicated device or element, construct and operate in specific orientation. Therefore, it cannot be construed as a restriction of this application.

In addition, the terms "first", "second", and the like are used for the purpose of description only, but not to be construed as indicating or implying a relative importance or implicitly indicating the number of technical features indicated. Thus, features defining "first" and "second" may include one or more of the features either explicitly or implicitly. In the description of the present application, "multiple" means two or more unless otherwise specifically defined.

The multi-leg independent mobile carrier device provided by the present application is described herein:

Embodiment 1

Please refer to FIG. 1. The multi-leg independent mobile carrier device consists of the base 1, travelling mechanism 2 and posture adjustment mechanism 3. Among them, the base 1 is for carrying person or object; the travelling mechanism 2 is for driving the base 1 to move over or cross an obstacle; the posture adjustment mechanism 3 is configured to keep the person or object in a balanced state. Where, the traveling mechanism 2 consists of the driving unit 21 and connecting rod unit 22. The said driving unit 21 is coupled to the base 1. The connecting rod unit can be rotatably coupled to the driving unit 21. Moreover, the posture adjustment mechanism 3 is coupled to the base 1. The preferred balanced state is in horizontal. It can be understood that the driving unit 21 can be connected to the base 1 via the posture adjustment mechanism 3 according to the specific situation and needs. The driving unit 21 can also be directly connected to the base 1. It is not excessively limited herein.

Please refer to FIG. 1. The multi-leg independent mobile carrier device consists of the base 1, travelling mechanism 2 and posture adjustment mechanism 3. Among them, the base 1 is for carrying person or object; the travelling mechanism 2 is for driving the base 1 to move over or cross an obstacle; the posture adjustment mechanism 3 is configured to maintain the person or object in a balanced state. Where, the traveling mechanism 2 consists of the driving unit 21 and connecting rod unit 22. The said driving unit 21 is coupled to the base 1. The connecting rod unit can be rotatably coupled to the driving unit 21. Moreover, the posture adjustment mechanism 3 is coupled to the base 1. The preferred balanced state is in horizontal. It can be understood that the driving unit 21 can be connected to the base 1 via the posture adjustment mechanism 3 according to the specific situation and needs. The driving unit 21 can also be directly connected to the base 1. It is not excessively limited herein.

Figure 2:
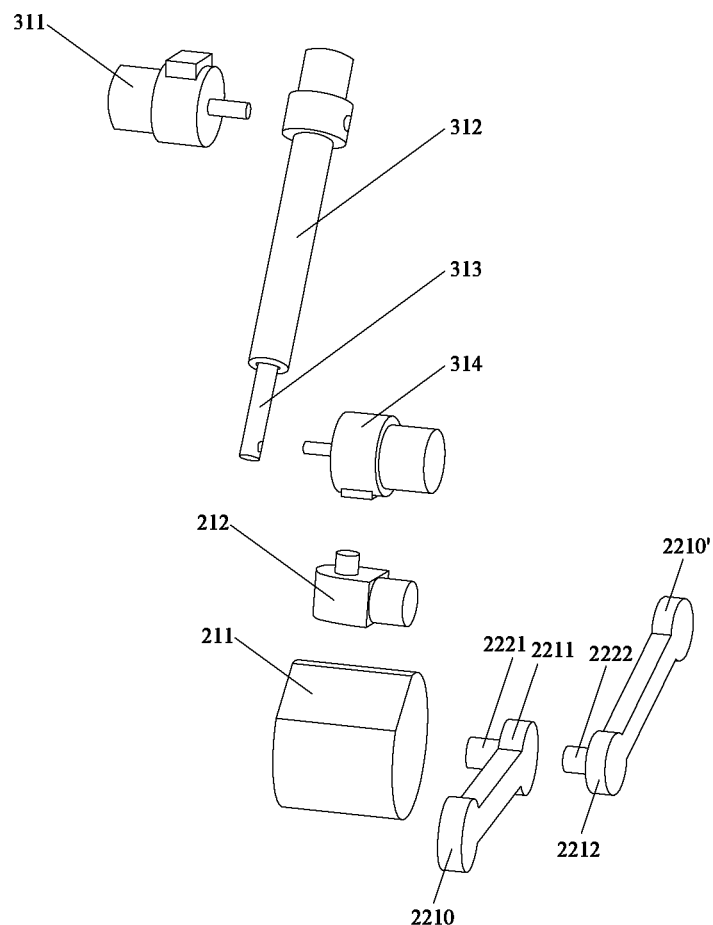
FIG. 2 is the breakdown diagram of the 1st supporting assembly of the posture adjustment mechanism of the multi-leg independent mobile carrier device presented in the embodiment 1.

It is preferable to refer to FIG. 1 and FIG. 2. In the embodiments of the present application, the posture adjustment mechanism comprises four groups of the 1st supporting assemblies 31 which are symmetrically distributed on two opposite sides of the base 1, namely setting two groups of the 1st supporting assemblies 31 on two opposite sides of the base 1. The said 1st supporting assembly 31 consists of the 1st driving member 311, the 2nd driving member 312, the 1st telescopic rod 313 and the 3rd driving member 314. Among them, the 1st driving member is coupled to the base 1; the 2nd driving member 312 can be rotatably coupled to the 1st driving member 311; one side of the 1st telescopic rod 313 stretch out of the 2nd driving member 312; the 3rd driving member 314 can be rotatably coupled to the extension end of the 1st telescopic rod 313; and the 3rd driving member 314 is coupled to the driving unit 21. Where, the 1st driving member 311 and the 3rd driving member 314 can be motor, hydraulic or pneumatic motor, and are connected to the control system inside the multi-leg independent mobile carrier device. The 2nd driving member 312 can be motor, air cylinder or hydraulic cylinder, and is connected to the control system inside the multi-leg independent mobile carrier device; specifically, the housing of the 1st driving member 311 is firmly coupled to the base; the driving shaft of the 1st driving member 311 is firmly coupled to one end of the housing of the 2nd driving member 312; the 1st driving member can drive the 2nd driving member 312 to rotate via the driving shaft; the extension end of the 1st telescopic rod 313 is firmly coupled to the driving shaft of the 3rd driving member 314; the 3rd driving member 314 can rotate via the driving shaft which will further drive the travelling mechanism 2 firmly connected to the housing to rotate; when working, the 1st driving member 311 and the 3rd driving member 314 are equivalent to human hip joint and knee joint; the travelling mechanism 2 is equivalent to crus and foot. Meanwhile, the 1st driving member 312 adjusts the height of the base 1 above the ground in real time, and absorbs the reactive force of the travelling mechanism 2 in the driving process thus to maintain the person or object on the base 1 in horizontal state, effectively reduce vibration and improve riding comfort and loading stability of the multi-leg independent mobile carrier device.

Figure 3:
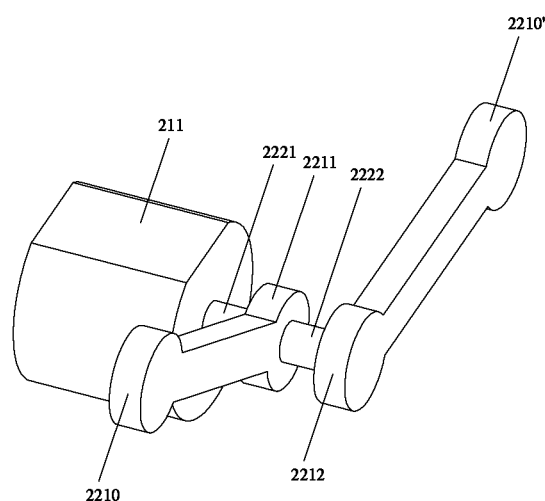
FIG. 3 is the stereogram of the travelling mechanism of the multi-leg independent mobile carrier device presented in the embodiment 1.
Figure 4A:
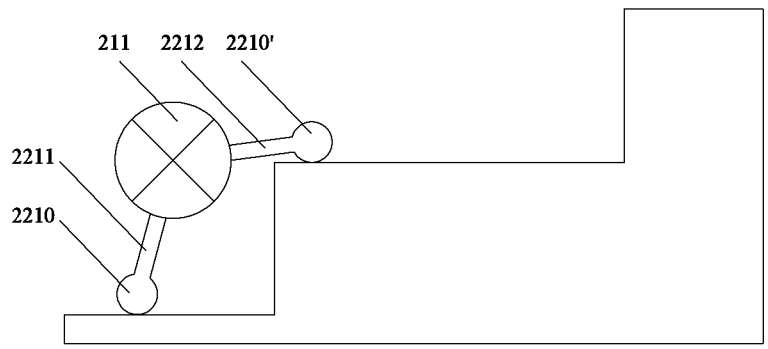
FIG. 4a shows the first step of the working principle of the travelling mechanism in the embodiment 1 of the present application.
Figure 4B:
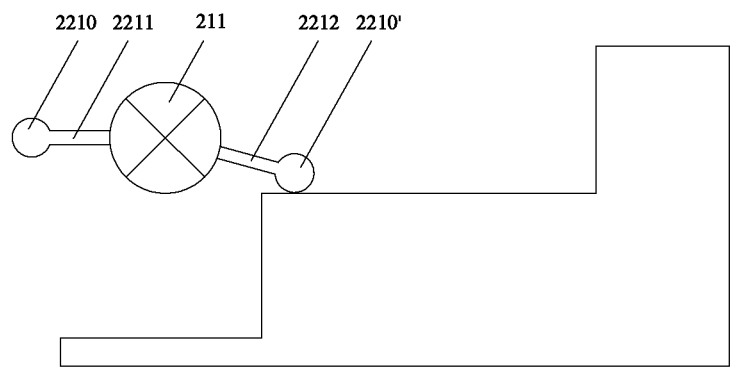
FIG. 4b shows the second step of the working principle of the travelling mechanism in the embodiment 1 of the present application.
Figure 4C:
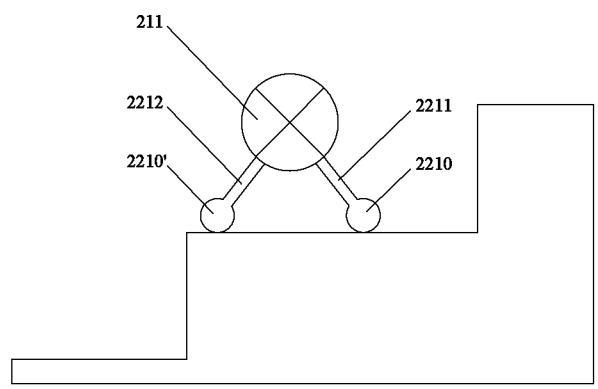
FIG. 4c shows the third step of the working principle of the travelling mechanism in the embodiment 1 of the present application.
Figure 4D:
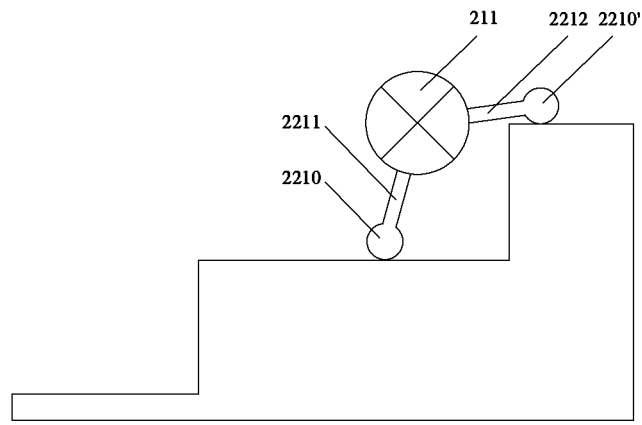
FIG. 4d shows the fourth step of the working principle of the travelling mechanism in the embodiment 1 of the present application.

It is preferable to refer to FIG. 1 and FIG. 3. In the embodiments of the present application, travelling mechanism 2 consists of four groups of driving units 21 and four groups of connecting rod units 22, which are corresponding to the 1st supporting assembly 31 respectively. Where, the driving unit 21 consists of the 8th driving member 211 and steering member 212, and the connecting rod unit 22 consists of the connecting rod group 221 and the connecting shaft group 222; where the 8th driving member 211 and steering member 212 can be motor, hydraulic or pneumatic motor, and are connected to the control system inside the multi-leg independent mobile carrier device; the connecting rod group 221 consists of the 1st connecting rod 2211 with feet contacting the ground or the stepped surface at the end and the 2nd connecting rod 2212. The connecting shaft group 222 consists of the 1st connecting shaft 2221 and the 2nd connecting shaft 2222; specifically, the driving shaft of the steering member 212 is firmly coupled to the top surface of the 8th driving member. The 1st connecting rod 2211 and the 2nd connecting rod 2212 are located on the same side of the 8th driving member 211 without interference nor overlapping; one end of the 1st connecting shaft 2221 is rotatably coupled to the 8th driving member 211, and the other end of the 1st connecting shaft is firmly coupled to the end opposite to the foot end 2210 of the 1st connecting rod 2211; one end of the 2nd connecting shaft 2222 is rotatably coupled to the end opposite to the foot end 2210 of the 1st connecting rod 2211, and the other end of the 2nd connecting shaft 2222 is firmly coupled to the end opposite to the foot end 2210' of the 2nd connecting rod 2212. In addition, the central axis of the 1st connecting shaft 2221 and that of the 2nd connecting shaft 2222 are on the same straight line. During operation, the multi-leg independent mobile carrier device controls the steering member 212 to drive the 8th driving member 211 via the control system. The 8th driving member 211 will further drive the 1st connecting rod 2211 and the 2nd connecting rod 2212 for steering thus to improve the movement flexibility of the multi-leg independent mobile carrier device.

Please refer to FIG. 4a to FIG. 4d. In the embodiments of the present application, set the upper and lower steps of the multi-leg independent mobile carrier device as example to indicate the working principle of the traveling mechanism 2: step 1: the peripheral surface of the foot 2210 of the 1st connecting rod 2210 contacts with the ground. Lift the 8th driving member 211. After that, the 8th driving member 211 drives the 2nd connecting rod 2212 to rotate, and make the 2nd connecting rod 2212 to turned forward relative to the foot 2210 of the 1st connecting rod 2211 until the peripheral surface of the foot 2210' of the 2nd connecting rod 2212 contact with the horizontal plane of the first step; step 2: the 8th driving member 211 continues to drive the 2nd connecting rod 2212 to rotate via the 2nd connecting shaft 2222. In addition, the 8th driving member 211 drives the 1st connecting rod 2211 to continue to rotate via the 1st connecting shaft 2221 until the peripheral surface of the foot 2210 of the 1st connecting rod to get away from the ground; step 3: the 8th driving member 211 continues to drive the 2nd connecting rod 2212 to rotate via the 2nd connecting shaft 2222. In addition, the 8th driving member 211 drives the 1st connecting rod 2221 to continue to rotate via the 1st connecting shaft 2221 and make the 1st connecting rod 2211 to turned forward relative to the foot 2210' of the 2nd connecting rod 2212 until the peripheral surface of the foot 2210 of the 1st connecting rod 2211 contact with the horizontal plane of the first step; step 4: repeat the actions of the first step to the horizontal plane of the second step. Repeat the steps alternately to complete upper stepping. In addition, since the principle of lower stepping of the multi-leg independent mobile carrier device is similar to that of the upper stepping, it is not further described herein.

Compared with existing technologies, the multi-leg independent mobile carrier device provided by the present application shows the following beneficial effects: It combines a travelling mechanism 2 and posture adjustment mechanism 3. Thanks to the 1st supporting assembly 31, the base 1 always keeps in horizontal state. Moreover, since the contact area between the foot 2210 (2210') and the ground, the friction between the ground is minimized as well. The steering member 212 enables the whole device move and steer more flexibly thus to effectively resolve the technological difficulties of traditional carriers such as failure to meet the requirements of strong obstacle crossing ability, comfortable riding and flexible moving. The combination has improved the obstacle crossing ability of the multi-leg independent mobile carrier device and enhanced the user experience.

Figure 5:
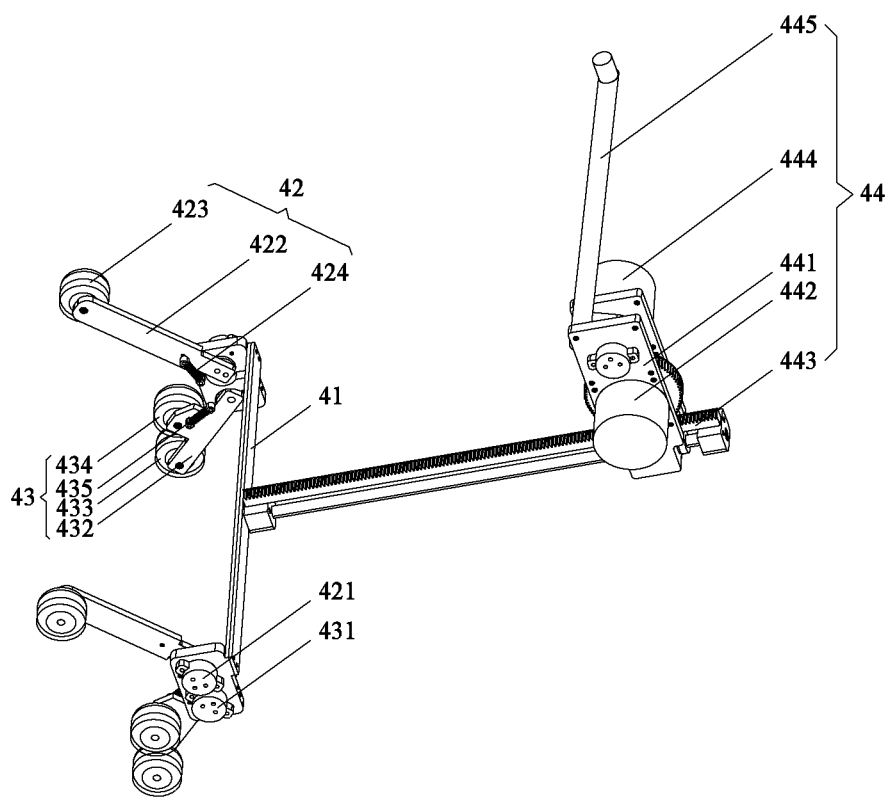
FIG. 5 is the stereogram of the detecting mechanism of the multi-leg independent mobile carrier device presented in the embodiment 1.

Furthermore, please refer to FIG. 5. In the embodiments of the present application, the aforementioned multi-leg independent mobile carrier device also includes the detecting mechanism 4 which is a touch detector for detecting the length and height of the step or the obstacle. Of course, according to specific situation and demands, in other embodiments of the present application, detecting mechanism 4 can also be other types of detectors include ultrasonic, radar or infrared detector, which are not limited herein. The detecting mechanism 4 consists of the 2nd bracket 41, length detecting device 42 and height detecting device 43. Among them, the 2nd bracket 41 is set on the front side of the base 1, namely setting the 2nd bracket 41 on the forward direction of the multi-leg independent mobile carrier device; the length detecting device 42 can measure the length of the step or the obstacle; the height detecting device 43 can measure the height of the step or the obstacle. In addition, one end of the 2nd bracket 41 is flexibly coupled to the base 1. The other end of the 2nd bracket 41 is coupled to the length detecting device 42 and height detecting device 43.

Specifically, the length detecting device 42 and height detecting device 43 are respectively connected to both ends of the 2nd bracket 41. Among them, the length detecting device 42 consists of the 1st position sensor 421, the 1st detecting rod 422, the 1st trolley 423 and the 1st elastic member 424. Moreover, the 1st detecting rod 422 presents "-" pattern. The 1st elastic member is preferably as strong spring. The 1st position sensor 421 is firmly coupled to the top of the 2nd bracket 41. One end of the 1st detecting rod 422 is rotatably coupled to the 1st position sensor 421. The 1st trolley 423 is rotatably coupled to the other end of the 1st detecting rod 422. One end of the 1st elastic member 424 is firmly coupled to the 1st detecting rod 422, and the other end of the 1st elastic member 424 is firmly coupled to the end of the 2nd bracket 41. When the 1st trolley 423 touches the step or obstacle, the 1st detecting rod 422 can rotate clockwise. The 1st elastic member 424 always applies impendence to the 1st detecting rod 422 to apply a pulling force to hinder the clockwise rotation, and make the 1st trolley 423 keep contacting with the step or obstacle. During this process, the 1st position sensor 424 measures the rotational angle data of the 1st detecting rod 422, and transmits such data to the internal control system of the multi-leg independent mobile carrier device to calculate the length of the step or obstacle; the height detecting device 43 consists of the 2nd position sensor 431, the 2nd detecting rod 432, the 2nd trolley 433, the 3rd trolley 434 and the 2nd position sensor 435. In addition, the 2nd detecting rod 432 presents "y" pattern, and forms an included angle with the 1st detecting rod 422. The 1st elastic member is preferably as strong spring. The 2nd position sensor 431 is firmly coupled to the bottom of the 2nd bracket 41, and at the bottom of the 1st position sensor. One end of the 2nd detecting rod 423 is rotatably coupled to the 2nd position sensor. The 2nd trolley 433 and the 4th trolley 434 are rotatably coupled to the other end of the 2nd detecting rod 432. One end of the 2nd elastic member 435 is firmly coupled to the 2nd detecting rod 432. The other end of the 2nd elastic member 435 is firmly coupled to the end of the 2nd bracket 41. When the 2nd trolley 433 and the 3rd trolley 424 touch the step or obstacle, the 2nd detecting rod 432 can rotate counterclockwise. The 2nd elastic member 435 always applies impendence to the 2nd detecting rod 432 to apply a pulling force to hinder the counterclockwise rotation, and make the 2nd trolley and the 3rd trolley 434 keep contacting with the step or obstacle. During this process, the 2nd position sensor 431 measures the rotational angle data of the 2nd detecting rod 432, and transmits such data to the internal control system of the multi-leg independent mobile carrier device to calculate the height of the step or obstacle.

Furthermore, please refer to FIG. 5. In the embodiments of the present application, the aforementioned detecting mechanism 4 also consists the coupling component 44 for rotating and expanding the aforementioned 2nd bracket 41 relative to the base 1. Where, one end of the coupling component 44 is firmly coupled to the base 1. The other end of the coupling component 44 is firmly coupled to the 2nd bracket 41. Specifically, the coupling component 44 consists of the connecting body 441, the 9th driving member 442, the 5th telescopic rod 443, the 10th driving member 444 and the 2nd coupling component 445. Among them, the 9th driving member 442 and the 10th driving member 444 can be motor, hydraulic or pneumatic motors designed as attaching on the connecting body 44, and are connected to the control system inside the multi-leg independent mobile carrier device. The 9th driving member 442 and the 5th telescopic rod 443 are connected by engaging. And the 9th driving member 442 can drive the 5th telescopic rod 443 to move forward and backward. One end of the 5th telescopic rod 443 is firmly coupled to the 2nd bracket 41. And the 5th telescopic rod 443 is mutual vertical to the 2nd bracket 41. The other end of the 5th telescopic rod through the connecting body 441. Moreover, the 10th driving member 444 is firmly coupled to the 2nd coupling component 445. And the 10th driving member 444 is rotatably coupled to the connecting body 441. The 10th driving member 444 can drive the connecting body 441 to wiggle relative to the 2nd coupling component 445. The other end of the 2nd coupling component 445 is firmly coupled to the front end of the base 1. During operation, according to the specific situation and needs, first adjust the posture of the 2nd bracket 41 via the coupling component 44 to further increase the contact area of the 1st trolley 423, the 2nd trolley 433, the 3rd trolley 434 and the step surface or obstacle surface, and enhance the measurement accuracy of the 1st position sensor 421 and the 2nd position sensor 431. Due to the special structure of the length detecting device 42 and the height detecting device 43, it can detect conventional stairs, spiral stairs, hollow stairs, etc.

Embodiment 2

Figure 6:
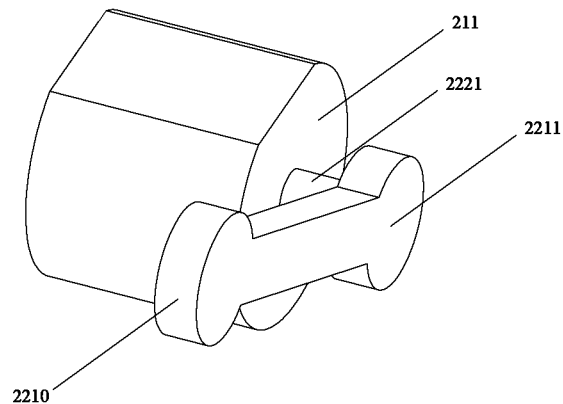
FIG. 6 is the stereogram of the travelling mechanism of the multi-leg independent mobile carrier device presented in the embodiment 2.
Figure 7A:
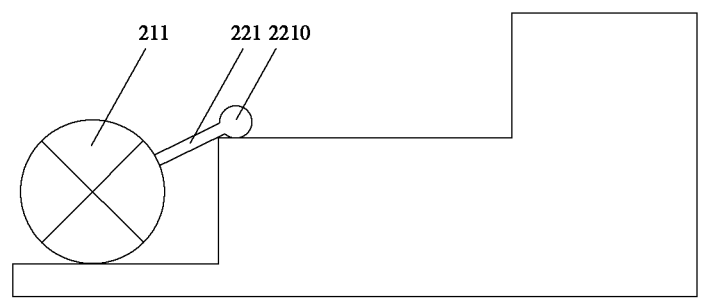
FIG. 7a shows the first step of the working principle of the travelling mechanism in the embodiment 2 of the present application.
Figure 7B:
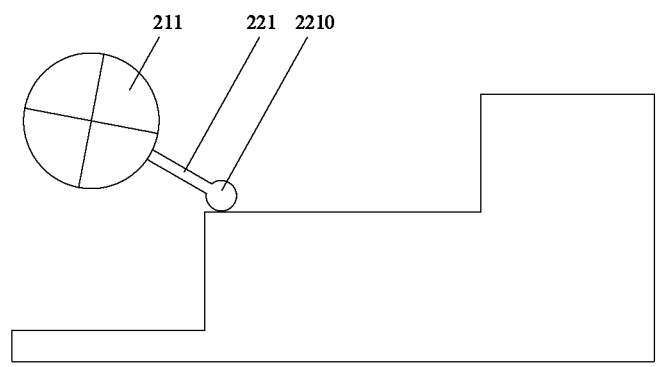
FIG. 7b shows the second step of the working principle of the travelling mechanism in the embodiment 2 of the present application.
Figure 7C:
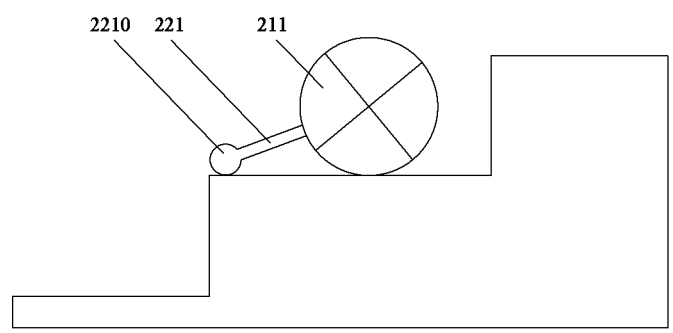
FIG. 7c shows the third step of the working principle of the travelling mechanism in the embodiment 2 of the present application.
Figure 7D:
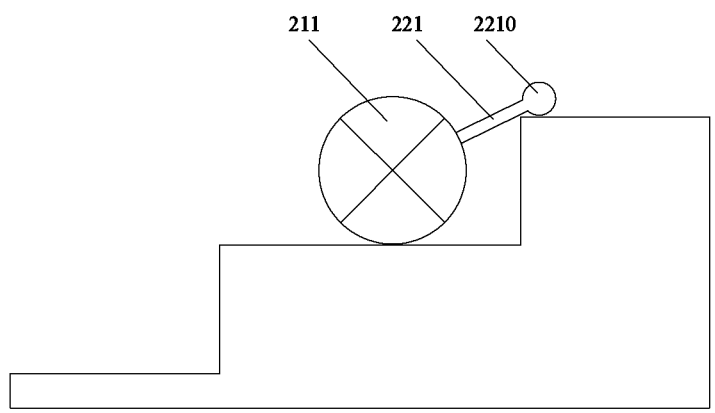
FIG. 7d shows the fourth step of the working principle of the travelling mechanism in the embodiment 2 of the present application.

Please refer to FIG. 6. The multi-leg independent mobile carrier device disclosed in this embodiment is basically identical with that disclosed in the embodiment 1. The difference is that: The aforementioned connecting rod group 221 consists of the 1st connecting rod 2211 with feet 2210 contacting the ground or the stepped surface at the end. The connecting shaft group 222 consists of the 1st connecting shaft 2221; specifically, one end of the 1st coupling shaft 2221 is rotatably coupled to the 8th driving member 211. The other end of the 1st connecting shaft 2221 is firmly coupled to the end opposite to the foot 2210 of the 1st connecting rod 2211.

Please refer to FIG. 7a to FIG. 7d. In the embodiments of the present application, set the upper and lower steps of the multi-leg independent mobile carrier device as example to indicate the working principle of the traveling mechanism 2: step 1: in the initial state, the peripheral surface of the 8th driving member 211 contacts with the ground. And then, the 8th driving member 211 drives the 1st connecting rod 2211 to rotate via the 1st connecting shaft 2221 until the peripheral surface of the foot 2210 contacts the horizontal plane of the first step, and reversely works on the coupling end of the 1st connecting rod 2211 and the 1st connecting shaft 2221; step 2: according to the lever principle, the coupling end of the 1st connecting rod 2211 and the 1st connecting shaft 2221 rotate around the foot 5210 due to the reverse force. The 1st connecting rod 2211 turns forward which drives the 8th driving member 211 to turn forward as well until the 8th driving member 211 contacts the horizontal plane of the first step; step 3: the 8th driving member 211 continues to drive the 2nd connecting rod 2212 to rotate via the 2nd connecting shaft 2222. In addition, the 8th driving member 211 drives the 1st connecting rod 2211 to continue to rotate via the 1st connecting shaft 2221 until the peripheral surface of the foot 2210 of the 1st connecting rod to get away from the ground; step 3: the 8th driving member 211 continues to drive the 1st connecting rod 2211 to rotate via the 1st connecting shaft 2221 until the peripheral surface of the foot 2210 contacts with the horizontal plane of the second step, and repeat the actions of step 1; step 4: repeat the actions of step 2. Repeat the steps to complete upper stepping. In addition, since the principle of lower stepping of the multi-leg independent mobile carrier device is similar to that of the upper stepping, it is not further described herein.

Embodiment 3

Figure 8:
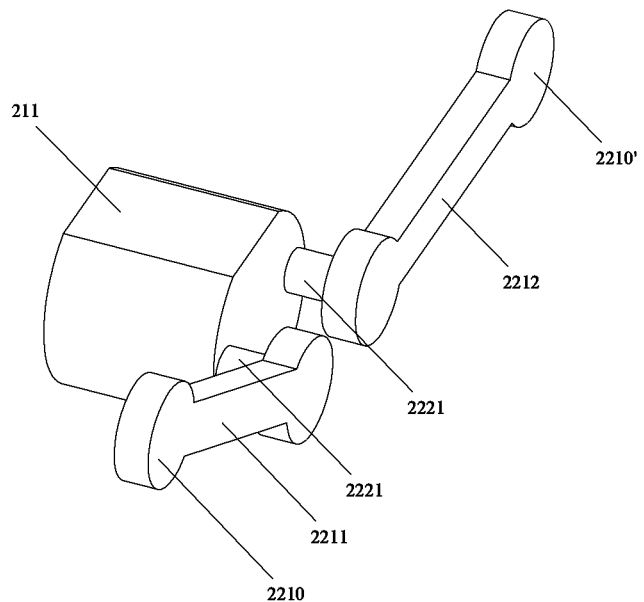
FIG. 8 is the stereogram of the travelling mechanism of the multi-leg independent mobile carrier device presented in the embodiment 3.

Please refer to FIG. 8. The multi-leg independent mobile carrier device disclosed in this embodiment is basically identical with that disclosed in the embodiment 1. The difference is that: The aforementioned connecting shaft group 222 consists of two the 1st connecting shaft 2221. One end of the 1st connecting rod 2211 is rotatably coupled to one of the 1st connecting shaft 2221 and the 8th driving member 211. In addition, one end of the 2nd connecting rod 2212 is rotatably coupled to the 8th driving member 211 via one connecting shaft 2221. Moreover, the two 1st connecting shafts 2221 are parallel to each other.

Embodiment 4

Figure 9:
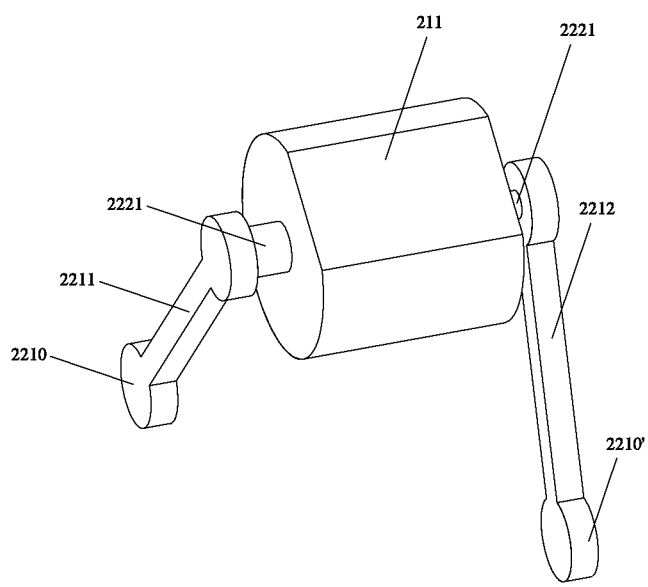
FIG. 9 is the stereogram of the travelling mechanism of the multi-leg independent mobile carrier device presented in the embodiment 4.

Please refer to FIG. 9. The multi-leg independent mobile carrier device disclosed in this embodiment is basically identical with that disclosed in the embodiment 1. The difference is that: The aforementioned connecting rod 2211 and the 2nd connecting rod 2212 are rotatably coupled to opposite two sides of the 8th driving member 211 respectively. The aforementioned connecting shaft group 222 consists of two the 1st connecting shaft 2221. One end of the 1st connecting rod 2211 is rotatably coupled to one of the 1st connecting shaft 2221 and the 8th driving member 211. In addition, one end of the 2nd connecting rod 2212 is rotatably coupled to the 8th driving member 211 via one connecting shaft 2221. Moreover, the central axis of the two 1st connecting shafts 2221 are on the same straight line.

Embodiment 5

Figure 10:
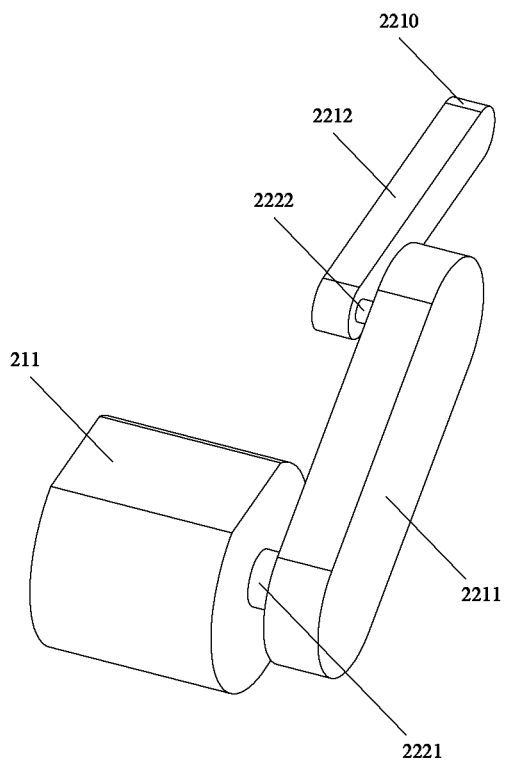
FIG. 10 is the stereogram of the travelling mechanism of the multi-leg independent mobile carrier device presented in the embodiment 5.
Figure 11A:
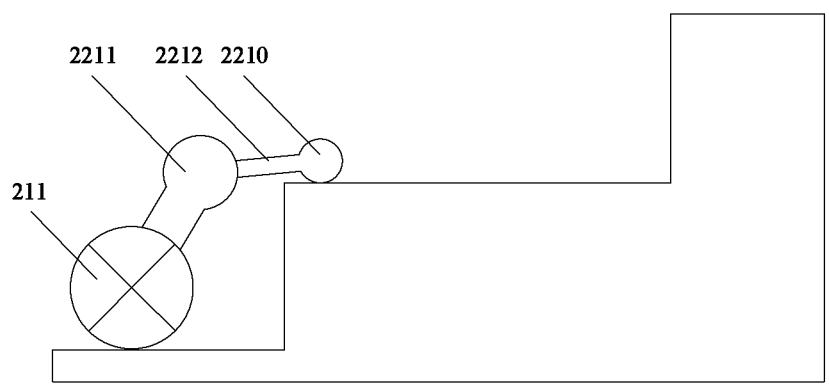
FIG. 11a shows the first step of the working principle of the travelling mechanism in the embodiment 5 of the present application.
Figure 11B:
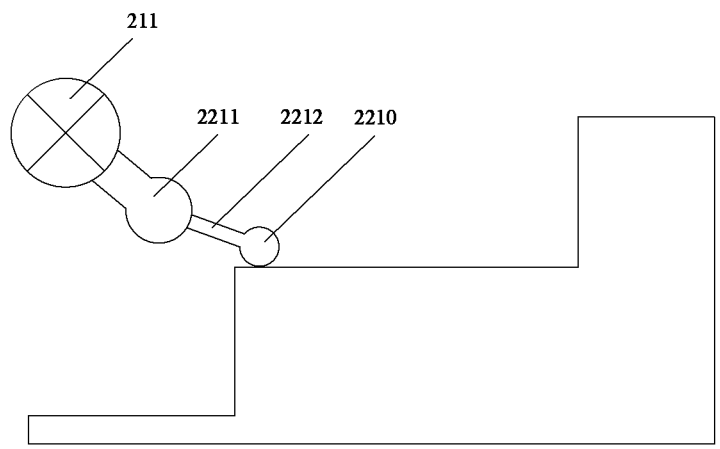
FIG. 11b shows the second step of the working principle of the travelling mechanism in the embodiment 5 of the present application.
Figure 11C:
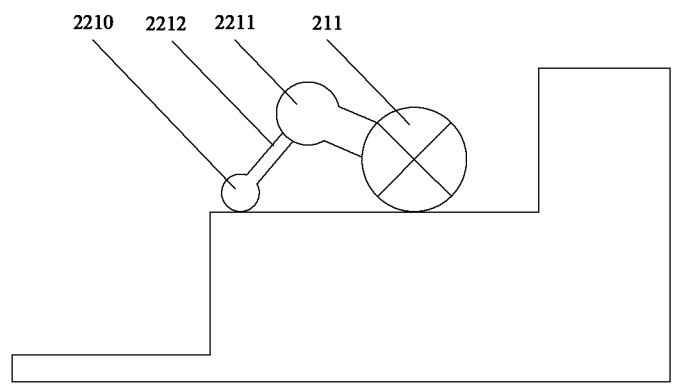
FIG. 11c shows the third step of the working principle of the travelling mechanism in the embodiment 5 of the present application.
Figure 11D:
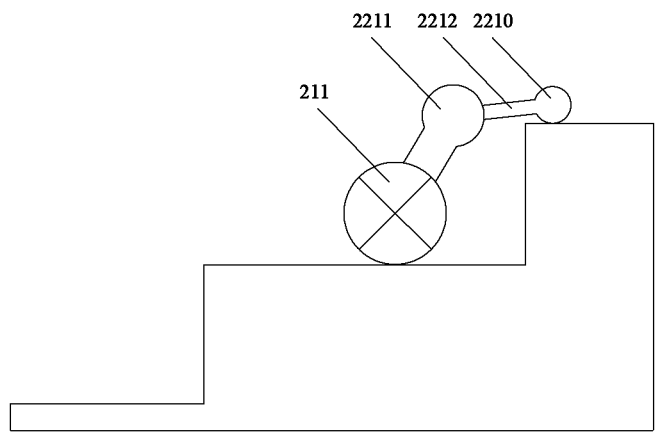
FIG. 11d shows the fourth step of the working principle of the travelling mechanism in the embodiment 5 of the present application.

Please refer to FIG. 10. The multi-leg independent mobile carrier device disclosed in this embodiment is basically identical with that disclosed in the embodiment 1. The difference is that: One end of the 1st connecting shaft 2221 is rotatably coupled to the 8th driving member 211. The other end of the 1st connecting shaft 2221 is firmly coupled to one end of the 1st connecting rod 2211. One end of the 2nd connecting shaft 2222 is rotatably coupled to the other end of the 1st connecting rod 2211. In addition, the other end of the 2nd connecting shaft 2222 is firmly coupled to the end opposite to the foot 2210 of the 2nd connecting rod. In addition, the central axis of the 1st connecting shaft is mutually parallel to that of the 2nd connecting shaft 2222.

Please refer to FIG. 11a to FIG. 11d. In the embodiments of the present application, set the upper and lower steps of the multi-leg independent mobile carrier device as example to indicate the working principle of the traveling mechanism 2: step 1: in the initial state, the peripheral surface of the 8th driving member 211 contacts with the ground. And then, the 8th driving member 211 drives the 1st connecting rod 2211 to rotate via the 1st connecting shaft 2221; in addition, the 1st connecting rod 2211 drives the 2nd connecting rod 2212 to turn forward via the 2nd connecting shaft 2222 until the peripheral surface of the foot 2210 contact the horizontal plane of the first step and the foot 2210 reversely acts on the 1st connecting rod 2211 and the 8th driving member 211; step 2: according to the lever principle, the 1st connecting rod 2211 and the 2nd connecting rod 2212 rotate around the foot 2210 due to the reverse force, and drive the 8th driving member 211 move forward; step 3: the peripheral surface of the 8th driving member 211 contacts the horizontal plane of the first step. And then the 8th driving member 211 makes the 1st connecting rod 2211 via the 1st connecting shaft 2221. In addition, the 1st connecting rod 2211 drives the 2nd connecting rod 2212 to leave the horizontal plane of the first step via the 2nd connecting shaft 2222; step 4: repeat the actions of step 1 to get to the horizontal plane of the second step. Repeat the steps alternately to complete upper stepping. In addition, since the principle of lower stepping of the multi-leg independent mobile carrier device is similar to that of the upper stepping, it is not further described herein.

Embodiment 6

Figure 12:
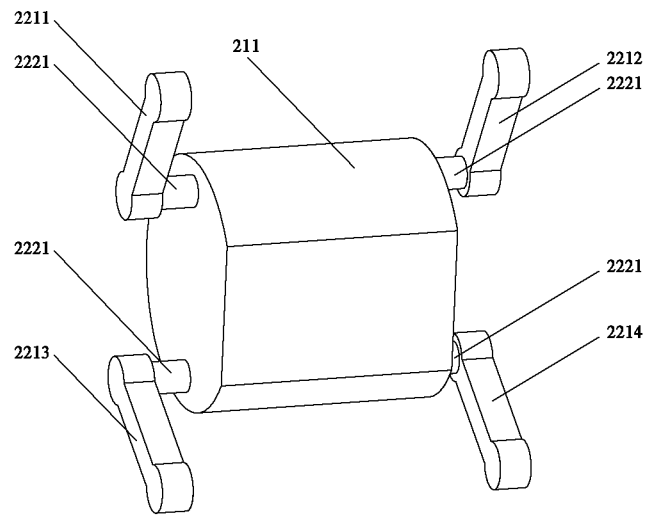
FIG. 12 is the stereogram of the travelling mechanism of the multi-leg independent mobile carrier device presented in the embodiment 6.

Please refer to FIG. 12. The multi-leg independent mobile carrier device disclosed in this embodiment is basically identical with that disclosed in the embodiment 1. The difference is that: The aforementioned connecting rod group 221 consists of the 1st connecting rod 2211, the 2nd connecting rod 2212, the 3rd connecting rod 2213 and the 4th connecting rod 2214, and the aforementioned connecting shaft group 222 consists four the 1st connecting shafts 2221; specifically, the 1st connecting rod 2211, the 2nd connecting rod 2212, the 3rd connecting rod 2213 and the 4th connecting rod 2214 are rotatably coupled to the 8th driving member 211 via the 1st connecting shaft 2221. The 1st connecting rod 2211 and the 2nd connecting rod 2212 are symmetrically distributed on opposite two sides of the 8th driving member 211. The 3rd connecting rod 2213 and the 4th connecting rod 2214 are symmetrically distributed on opposite two sides of the 8th driving member 211. In addition, the 1st connecting rod 2211 and the 3rd connecting rod 2213 are located on the same side of the 8th driving member 211 without interference nor overlapping; the 2nd connecting rod 2212 and the 4th connecting rod 2214 are located on the same side of the 8th driving member 211 without interference nor overlapping.

Embodiment 7

Figure 13:
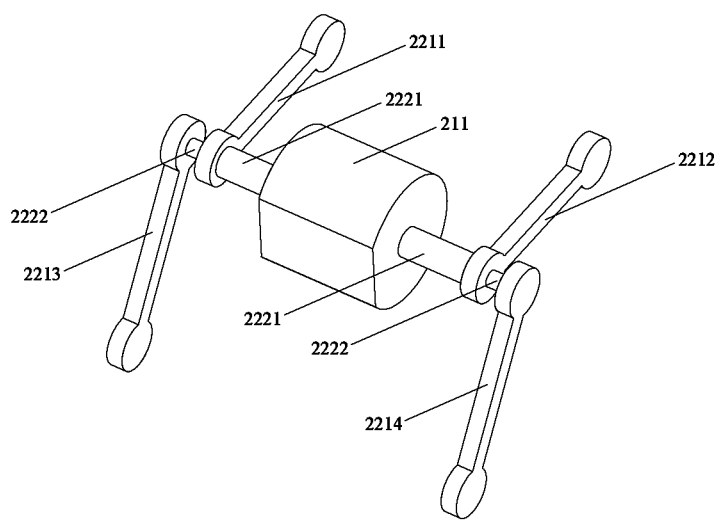
FIG. 13 is the stereogram of the travelling mechanism of the multi-leg independent mobile carrier device presented in the embodiment 7.

Please refer to FIG. 13. The multi-leg independent mobile carrier device disclosed in this embodiment is basically identical with that disclosed in the embodiment 6. The difference is that: The aforementioned connecting shaft group 222 consists of the 1st connecting shaft 2221 and two the 2nd connecting shaft 2222; specifically, the central axis of the 1st connecting shaft 2221 and that of the 2nd connecting shaft 2222 are on the same straight line. One end of the 3rd connecting rod is firmly coupled to one side of one 2nd connecting shaft 2222. The other end of the 2nd connecting shaft 2222 coupled to the 3rd connecting rod 2213 is rotatably coupled to the 8th driving member 211 through the 1st connecting shaft 2211. In addition, the other end of the 2nd connecting shaft 2222 coupled to the 4th connecting rod 2214 is rotatably coupled to the 8th driving member 211 through the 2nd connecting shaft 2212.

Embodiment 8

Figure 14:
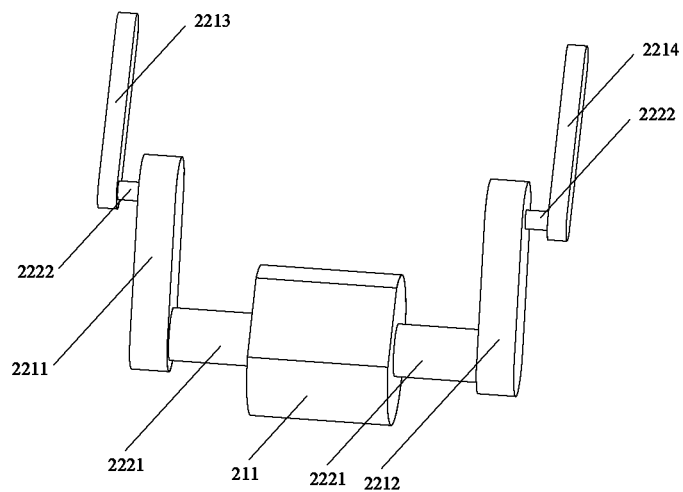
FIG. 14 is the stereogram of the travelling mechanism of the multi-leg independent mobile carrier device presented in the embodiment 8.

Please refer to FIG. 14. The multi-leg independent mobile carrier device disclosed in this embodiment is basically identical with that disclosed in the embodiment 5. The difference is that: The aforementioned connecting rod group 221 consists of the 1st connecting rod 2211, the 2nd connecting rod 2212, the 3rd connecting rod 2213 and the 4th connecting rod 2214, and the aforementioned connecting shaft group 222 consists two 1st connecting shafts 2221 and two 2nd connecting shafts 2222; specifically, the 1st connecting rod 2211 and the 2nd connecting rod 2212 are symmetrically distributed on opposite two sides of the 8th driving member 211. The 3rd connecting rod 2213 and the 4th connecting rod 2214 are symmetrically distributed on opposite two sides of the 8th driving member 211. In addition, the 1st connecting rod 2211 and the 3rd connecting rod 2213 are located on the same side of the 8th driving member 211 without interference nor overlapping; the 2nd connecting rod 2212 and the 4th connecting rod 2214 are located on the same side of the 8th driving member 211 without interference nor overlapping. The central axes of the two 1st connecting shafts 2221 are on the same straight line. The two 2nd connecting shafts 2222 are parallel to each other. And the two 2nd connecting shafts 2222 are parallel to the two 1st connecting shafts 2221 respectively.

Embodiment 9

The multi-leg independent mobile carrier device disclosed in this embodiment is basically identical with that disclosed in the embodiment 8. The difference is that: The aforementioned 1st connecting shaft 2221 presents certain angle to the 2nd connecting shaft 2222, making the 3rd connecting rod 2213 and the 4th connecting rod 2214 to form conical movement trajectory respectively.

Embodiment 10

Figure 15:
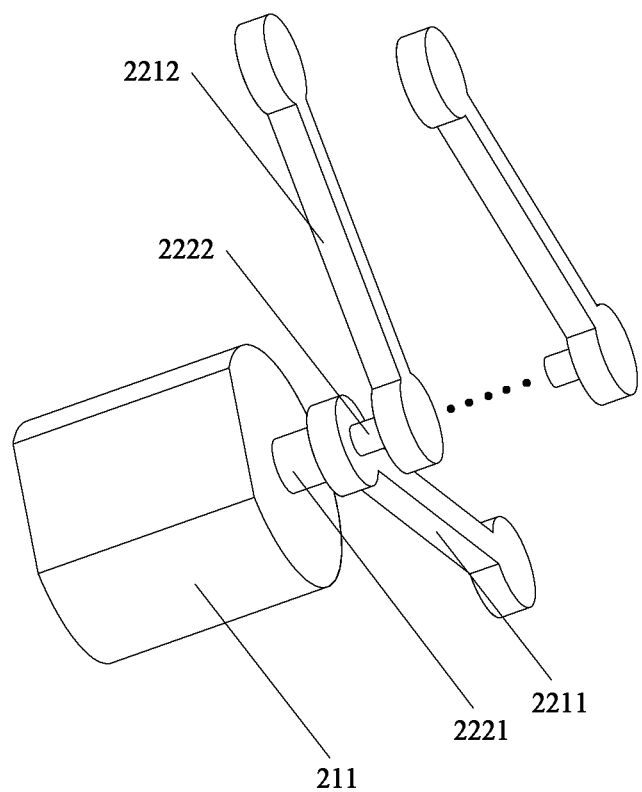
FIG. 15 is the stereogram of the travelling mechanism of the multi-leg independent mobile carrier device presented in the embodiment 10.

Please refer to FIG. 15. The multi-leg independent mobile carrier device disclosed in this embodiment is basically identical with that disclosed in the embodiment 1. The difference is that: The aforementioned connecting rod group 221 consists more than two connecting rods. The aforementioned connecting shaft group 222 consists more than two connecting shafts. All the connecting rods are located on the same side of the 8th driving member 211 without interference nor overlapping. The central axes of all the connecting shafts are on the same straight line.

Embodiment 11

Figure 16:
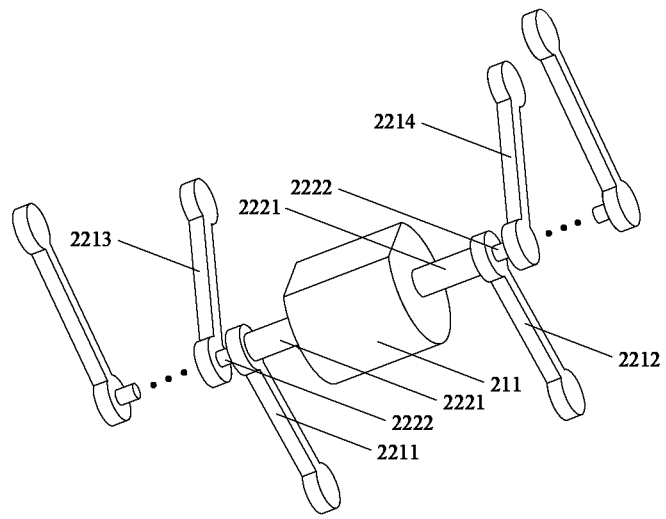
FIG. 16 is the stereogram of the travelling mechanism of the multi-leg independent mobile carrier device presented in the embodiment 11.

Please refer to FIG. 16. The multi-leg independent mobile carrier device disclosed in this embodiment is basically identical with that disclosed in the embodiment 10. The difference is that: The aforementioned connecting rod group 221 consists of connecting rods of integral multiple of two. The aforementioned connecting shaft group 222 consists of connecting shafts of integral multiple of two. All the connecting rods are symmetrically distributed on opposite two sides of the 8th driving member 211. The central axes of all the connecting shafts are on the same straight line.

Embodiment 12

Figure 17:
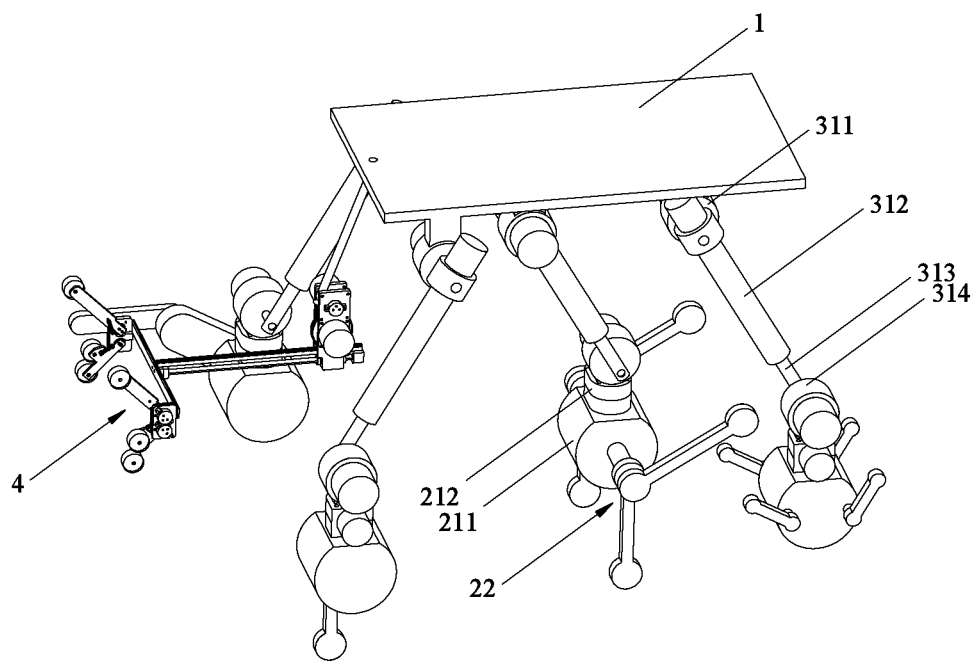
FIG. 17 is the stereogram of the multi-leg independent mobile carrier device presented in the embodiment 12.
Figure 18:
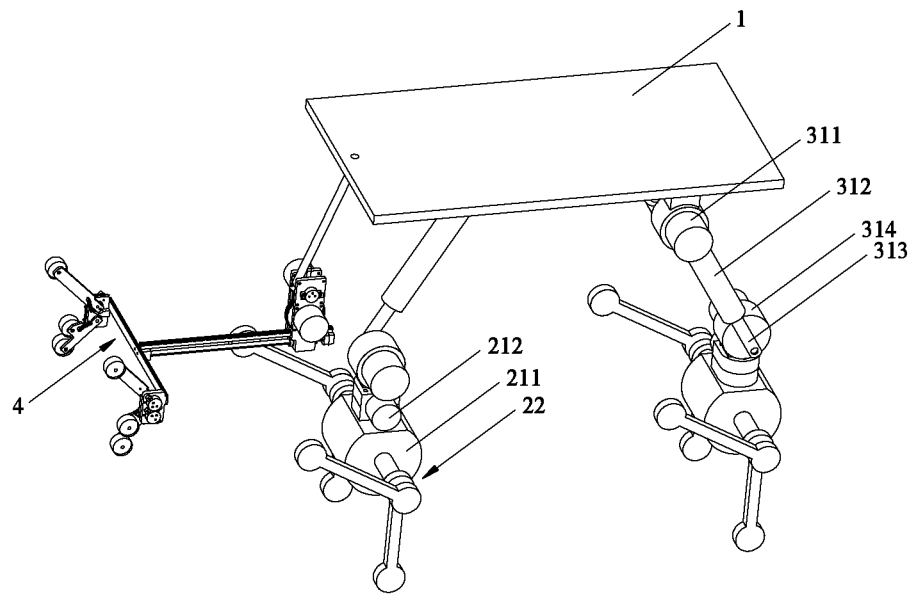
FIG. 18 is the stereogram of the multi-leg independent mobile carrier device presented in the embodiment 13.

Please refer to FIG. 17. The multi-leg independent mobile carrier device disclosed in this embodiment is basically identical with that disclosed in the embodiment 1. The difference is that: The quantities and distribution methods of connecting rods and connecting shafts correspondingly connected to the 1st supporting assembly 31 of each group are different.

Embodiment 13

Please refer to FIG. 17. The multi-leg independent mobile carrier device disclosed in this embodiment is basically identical with that disclosed in the embodiment 1. The difference is that: The aforementioned posture adjustment mechanism 3 consists two groups of the 1st supporting assemblies 31 which are set at the front and rear part of the base 1 respectively. And the two groups of the 1st supporting assemblies 31 are symmetrically distributed at the front and rear part; in addition, connecting rod units 22 are coupled to the left and right sides of the driving unit 21 which is rotatably coupled to the 3rd driving member 314, namely the connecting rod units 22 are symmetrically connected to the left and right sides of the 8th driving member 211.

Embodiment 14

The multi-leg independent mobile carrier device disclosed in this embodiment is basically identical with that disclosed in the embodiment 1. The difference is that: The aforementioned posture adjustment mechanism 3 consists three groups of the 1st supporting assemblies 31 which are uniformly distributed at the bottom of base 1 presenting in triangle pattern. The driving unit 21 and connecting rod unit 22 are connected to the 3rd driving member 314 of the 1st supporting assembly 31 of each group.

Embodiment 15

Figure 19:
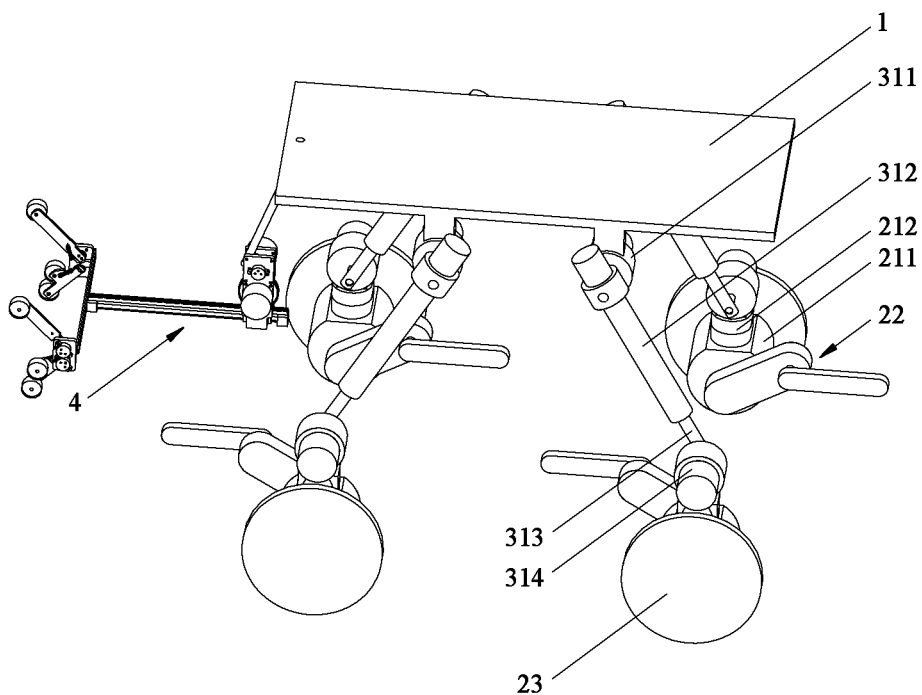
FIG. 19 is the stereogram of the multi-leg independent mobile carrier device presented in the embodiment 15.

Please refer to FIG. 19. The multi-leg independent mobile carrier device disclosed in this embodiment is basically identical with that disclosed in the embodiment 5. The difference is that: The aforementioned travelling mechanism 2 consists the wheel 23 which is drivingly coupled to the 8th driving member 211. And the wheel 23 and connecting rod unit 22 are distributed on opposite two sides of the 8th driving member 211. Preferably, the wheel 23 is rotatably coupled to the outside of the 8th driving member 211.

Embodiment 16

Figure 20:
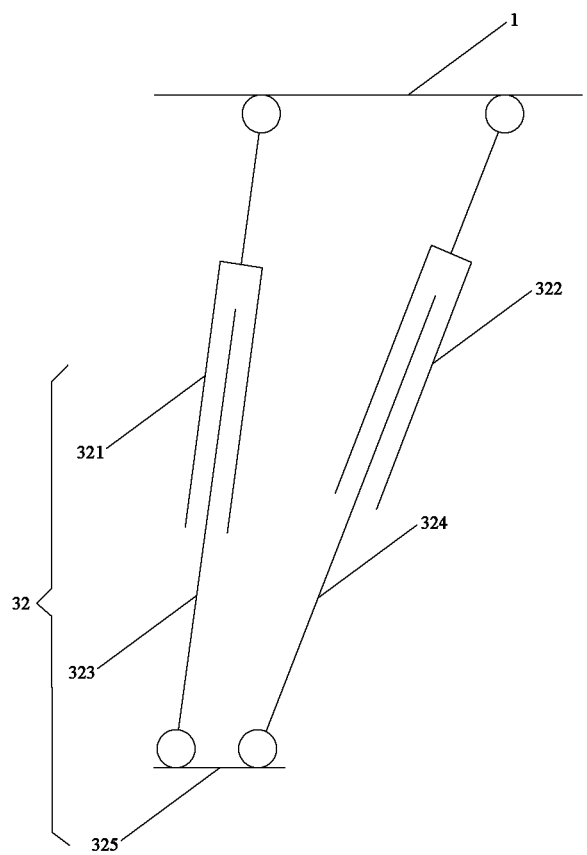
FIG. 20 is the breakdown diagram of the 2nd supporting assembly of the posture adjustment mechanism of the multi-leg independent mobile carrier device presented in the embodiment 16.
Figure 21:
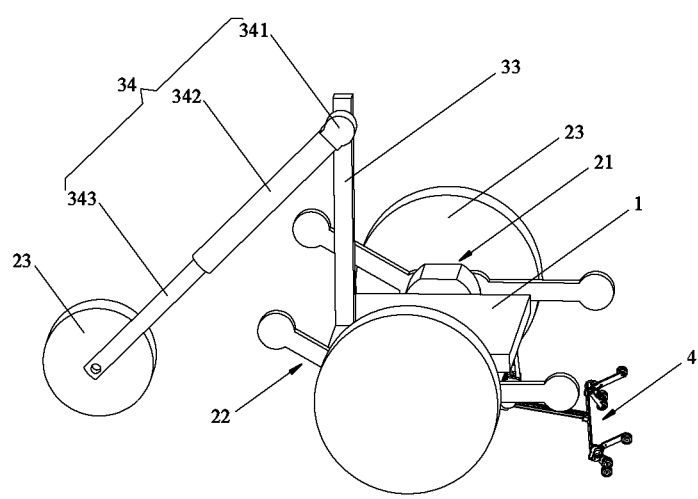
FIG. 21 is the stereogram of the multi-leg independent mobile carrier device presented in the embodiment 17.

Please refer to FIG. 20. The multi-leg independent mobile carrier device disclosed in this embodiment is basically identical with that disclosed in the embodiment 1. The difference is that: The aforementioned posture adjustment mechanism 3 comprises four groups of the 2nd supporting assemblies 32 which are symmetrically distributed on two opposite sides of the base 1, namely setting two groups of the 2nd supporting assemblies 32 on two opposite sides of the base 1. The said 2nd supporting assembly 32 consists of the 4th driving member 321, the 5th driving member 323, the 2nd telescopic rod 323, the 3rd telescopic rod 324 and the 1st adapting piece 325. Among them, one side of the 4th driving member 321 is hinged to the base 1; one side of the 5th driving member 321 is hinged to the base 1; the 2nd telescopic rod 323 can be telescopically coupled to the 4th driving member 321, and the extension end of the 2nd telescopic rod 323 stretches out from the other end of the 4th driving member 321; the 3rd telescopic rod can be telescopically coupled to the 5th driving member 322 and the extension end of the 3rd telescopic rod stretches out from the other end of the 5th driving member 322. In addition, one side of the 1st adapting piece 325 is hinged to the extension end of the 2nd telescopic rod 323 and that of the 3rd telescopic rod 324. The other side of the 1st adapting piece 325 is coupled to the driving member 21. Where, the 4th driving member 321 and the 5th driving member 322 can be motor, air cylinder or hydraulic cylinder, and are connected to the control system inside the multi-leg independent mobile carrier device. Thus, according to the motion principle of quadrangle, and jointly driving by the 4th driving member 321 and the 5th driving member 322, the 2nd supporting assembly 32 can swing back and forth relative to the base 1 thus to further keep the base 1 in horizontal state, not requiring the 1st driving member 311 and the 3rd driving member 314 which is beneficial to reducing the production costs of the multi-leg independent mobile carrier device.

Embodiment 17

Please refer to FIG. 20. The multi-leg independent mobile carrier device disclosed in this embodiment is basically identical with that disclosed in the embodiment 1. The difference is that: The aforementioned posture adjustment mechanism 3 comprises the 1st bracket 33 and the 3rd supporting assembly 34. Where, the 1st bracket 33 is firmly set on the base 1. The 3rd supporting assembly 34 is rotatably coupled to the 1st bracket 33. In addition, the aforementioned travelling mechanism 2 also includes at least three wheels 23. Moreover, the travelling mechanism prefers including three wheels 23, two of the wheels 23 are rotatably coupled to the opposite two sides of the base 1, namely both wheels are respectively set on the left and right sides of the base 1 which facilitates the base 1 to keep posture adjustment. Furthermore, both wheels 23 are drivingly coupled to the driving unit 21. In addition, the 3rd supporting assembly 34 consists of the 6th driving unit 341, the 7th driving unit and the 4th telescopic rod 343. Among them, the 6th driving unit 341 can be rotatably coupled to the 1st bracket 33; the 7th driving unit 342 is coupled to the 6th driving unit 341. The 4th telescopic rod can be telescopically coupled to the 7th driving unit 342. And one end of the 4th telescopic rod stretches out of the 7th driving unit 342. One of the wheels 23 is rotatably coupled to the 4th telescopic rod 343. In this way, the three wheels 23 respectively form a triangular structure with the contact points of the ground, which is beneficial to improve the stability of the multi-leg independent mobile carrier device.

Specifically, the 6th driving member 341 can be motor, air cylinder or hydraulic cylinder, and is connected to the control system inside the multi-leg independent mobile carrier device. The driving shaft of the 6th driving member 341 is firmly coupled to the 1st bracket 33 to drive the 7th driving member 342 to swing relative to the 1st bracket; when the wheel 23 and the connecting rod unit 22 works together to climb steps or cross over obstacles, the 6th driving member 341 drives the 7th driving member 342 to make the wheel 23 below the 4th telescopic rod 343 to move towards the base 1, reduce the included angle between the 7th driving member 342 and the 1st bracket 33 thus to lift gravity center of base on and keep the top surface of base 1 and that of the step or obstacle remain parallel; when the wheel 23 and the connecting rod unit 22 works together to climb steps down or cross over obstacles, the 6th driving member 341 drives the 7th driving member 342 to make the wheel 23 below the 4th telescopic rod 343 to move away from the base 1, increase the included angle between the 7th driving member 342 and the 1st bracket 33 thus to drop the gravity center of base on and keep the top surface of base 1 and bottom of the step or obstacle remain parallel; therefore, the base 1 is always kept in horizontal state. It has improved the ride comfort and loading stability of the multi-leg independent mobile carrier device.

Embodiment 18

Figure 22:
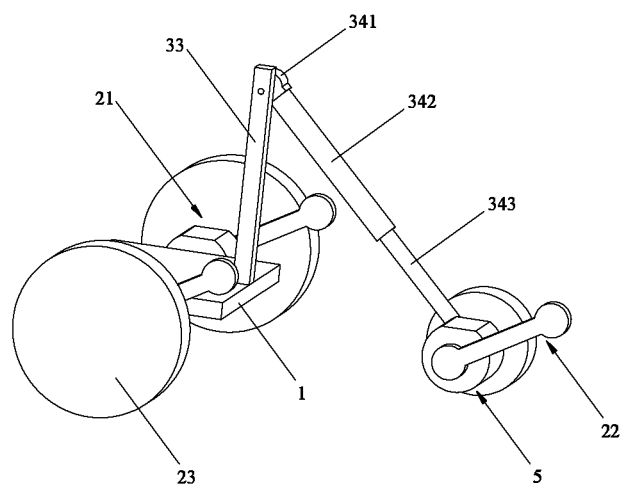
FIG. 22 is the stereogram of the multi-leg independent mobile carrier device presented in the embodiment 18.
Figure 23:
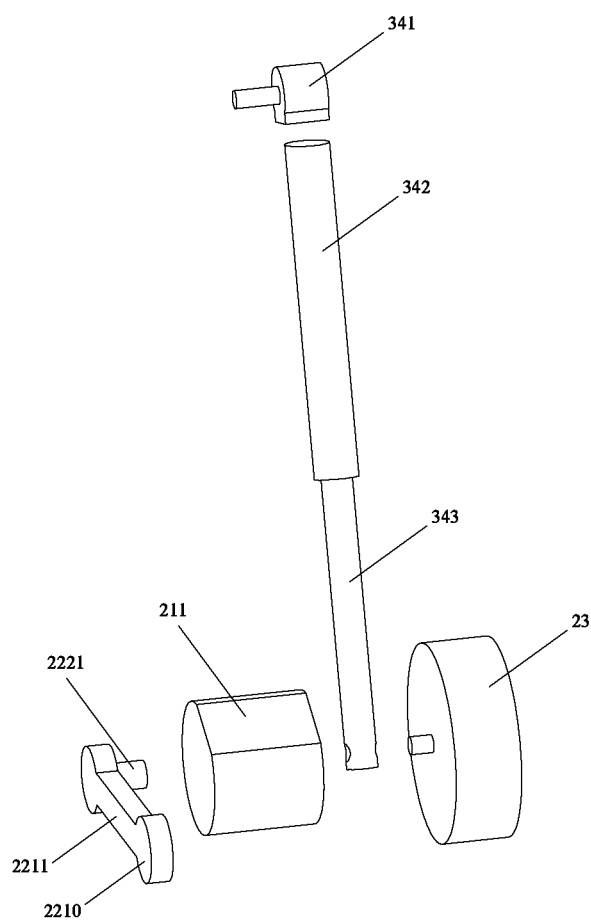
FIG. 23 is the breakdown diagram of the 3rd supporting assembly of the posture adjustment mechanism of the multi-leg independent mobile carrier device presented in the embodiment 18.

Please refer to FIG. 22 and FIG. 23. The multi-leg independent mobile carrier device disclosed in this embodiment is basically identical with that disclosed in the embodiment 17. The difference is that: the extension end of the aforementioned 4th telescopic rod 343 is rotatably coupled to the driving unit 21 and wheel 23. And the wheel 23 is drivingly coupled to the driving unit 21.

Embodiment 19

Figure 24:
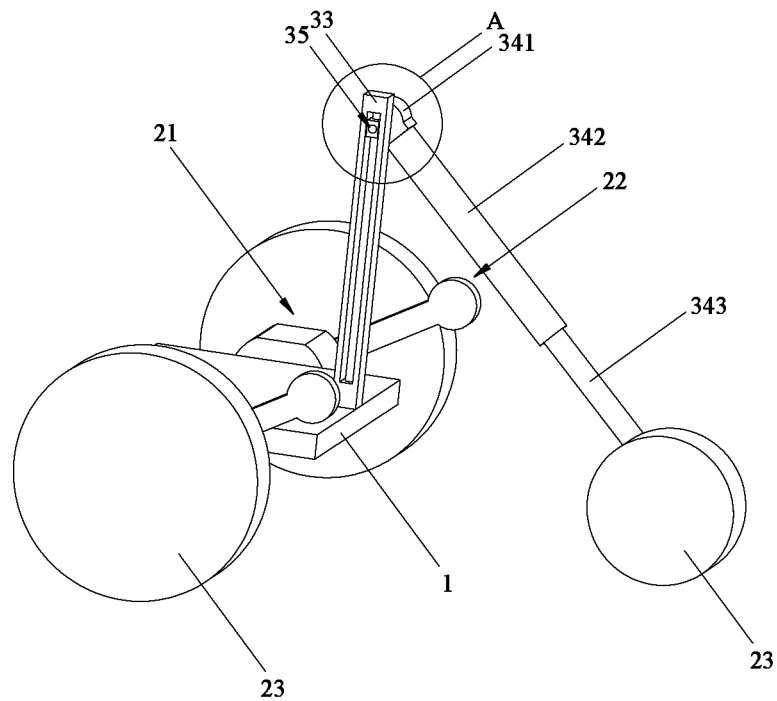
FIG. 24 is the stereogram of the multi-leg independent mobile carrier device presented in the embodiment 19.
Figure 25:
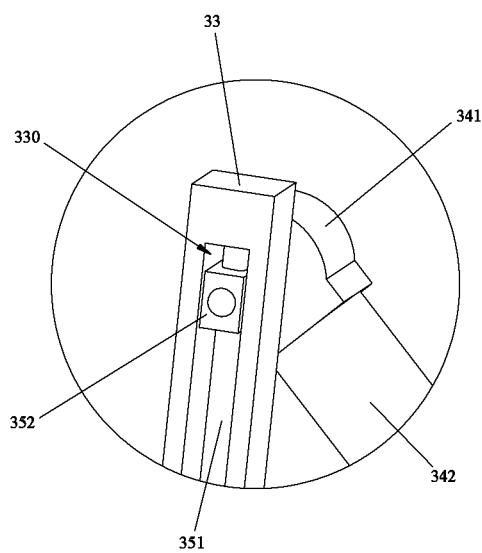
FIG. 25 is the enlarged schematic diagram of Part A of FIG. 24.
Figure 26:
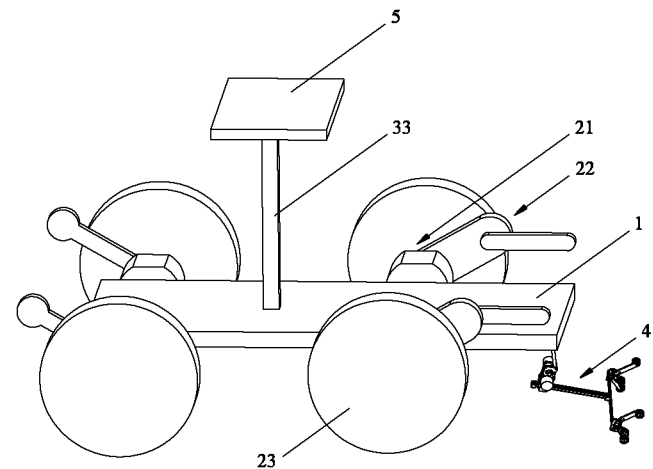
FIG. 26 is the stereogram of the multi-leg independent mobile carrier device presented in the embodiment 20.

Please refer to FIG. 24 and FIG. 25. The multi-leg independent mobile carrier device disclosed in this embodiment is basically identical with that disclosed in the embodiment 17. The difference is that: the aforementioned posture adjustment mechanism also consists the lifting assembly 35 which is set inside the 1st bracket, and is flexibly coupled to the 6th driving member 342. Wherein, the lifting assembly 35 includes a limiting rod 351 and a sliding block 352. Among them, the limiting rod 351 is embedded in the receiving groove 330 of the 1st bracket 33, and the sliding block 352 is set around the limiting rod 351. One end of the sliding block 352 is rotatably coupled to the driving shaft of the 6th driving member 342. During operation, the sliding block 352 can slide up and down along the limiting rod 351 under the control of the control system, and drives the 6th driving member 342 to lift or drop relative to the 1st bracket 33 so as to enhance the adjustment capability of the posture adjustment mechanism 3, keep the base 1 always in horizontal state, and enhance the comfort of riding and loading stability of the multi-leg independent mobile carrier device.

Embodiment 20

Please refer to FIG. 24 and FIG. 25. The multi-leg independent mobile carrier device disclosed in this embodiment is basically identical with that disclosed in the embodiment 17. The difference is that: The aforementioned travelling mechanism 2 consists of wheels of integral multiple of two. The said integral multiple is greater than one time. The wheels of integral multiple of two are rotatably coupled to two opposite sides of the base 1 in symmetry. The wheels are drivingly coupled to the said driving unit 21. The said multi-leg independent mobile carrier device consists of a loading table 5 for carrying the said person or object as well; the aforementioned 6th driving member 341 is coupled to the loading table 5. Where, the 6th driving member 341 can drive the loading table 5 to swing relative to base 1 under the control of the control system thus to always keep the loading table 5 in horizontal and improve the comfort of riding and loading stability of the multi-leg independent mobile carrier device. In addition, the wheel 23 can work together with the connecting rod unit 22 to easily step up or down or cross over the obstacle.

Embodiment 21

Figure 27:
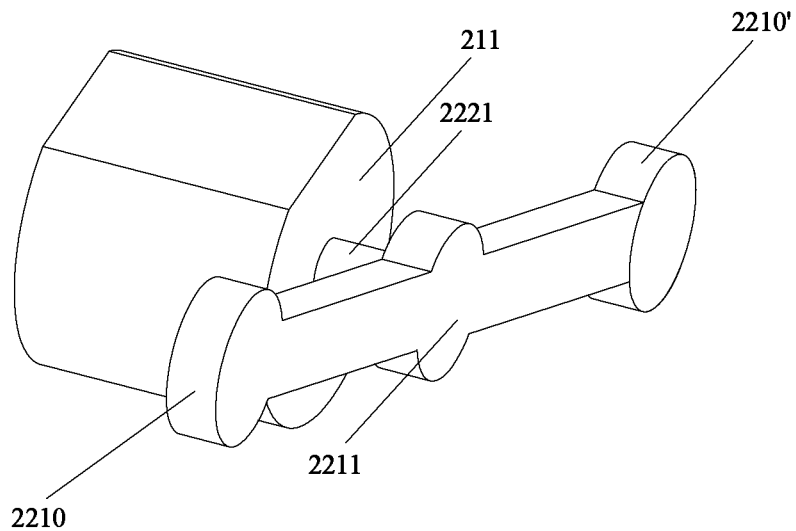
FIG. 27 is the stereogram of the travelling mechanism of the multi-leg independent mobile carrier device presented in the embodiment 21.

Please refer to FIG. 27. The multi-leg independent mobile carrier device disclosed in this embodiment is basically identical with that disclosed in the embodiment 2. The difference is that: One end of the 1st connecting shaft 2221 is rotatably coupled to the 8th driving member 211. The other end of the 1st connecting shaft 2221 is firmly coupled to the middle of the 1st connecting rod 2211. Both ends of the 1st connecting rod 2211 have the foot 2210 and 2210' which can contacting the ground or the stepped surface respectively. Where, the distance from the foot 2210 to the 1st connecting shaft 2221 is equal to that from the other foot 2210' to the 1st connecting shaft 2221.

Embodiment 22

The multi-leg independent mobile carrier device disclosed in this embodiment is basically identical with that disclosed in the embodiment 21. The difference is that: the distance from the foot 2210 to the 1st connecting shaft 2221 is greater than that from the other foot 2210' to the 1st connecting shaft 2221.

Embodiment 23

The multi-leg independent mobile carrier device disclosed in this embodiment is basically identical with that disclosed in the embodiment 1. The difference is that: The aforementioned 1st supporting assembly 31 also consists the 11th driving member (not shown in the figure). The 11th driving member can be motor, hydraulic or pneumatic motor, and is connected to the control system inside the multi-leg independent mobile carrier device. It is to connect the 1st driving member 311 and the 2nd driving member 312. Specifically, the driving shaft of the 11th driving member is firmly coupled to that of the 1st driving member 311. The bottom of the 11th driving member is firmly coupled to that of the 2nd driving member 312. During operation, the 1st driving member 311 drives the 11th driving member to swing back and forth. And the 11th driving member drives the 2nd driving member 312 to swing from left to right which enables the travelling mechanism 2 coupled to the 3rd driving member 314 swing back and forth, and from left to right as required under the control of the control system thus to effectively improve the movement flexibility of the multi-leg independent mobile carrier device.

The above embodiments are preferred for the present application but not intended to limit the present application. Any modifications, equivalent replacements and improvements made in the spirit and principles of this application shall be covered by this application.

The invention claimed is:

1. A multi-leg independent mobile carrier device comprising:
    a base for carrying people or objects;
    a travelling mechanism for driving the base to move over and cross an obstacle; said travelling mechanism comprises a driving unit coupled to the base, and a rotatable connecting rod unit coupled to the driving unit;
    a posture adjustment mechanism coupled to the base; said posture adjustment mechanism is configured to maintain the person or object in a balanced state;
    wherein said posture adjustment mechanism comprising:
    a 1st supporting assembly composed of the 1st driving member, a 2nd driving member which can be rotatably coupled to the 1st driving member, a 1st telescopic rod which can be telescopically coupled to the 2nd driving member with one end stretching out the 2nd driving member, and a 3rd driving member which can be rotatably coupled to the extension end of the 1st telescopic rod; the 3rd driving member is coupled to the driving unit.

2. The multi-leg independent mobile carrier device of claim 1, wherein the 1st supporting assembly further comprising:
    a 11th driving member for connecting the 1st and the 2nd driving members.

3. The multi-leg independent mobile carrier device of claim 1, wherein the posture adjustment mechanism comprising:
    a 2nd supporting assembly composed of a 4th driving member, a 5th driving member, a 2nd telescopic rod, a 3rd telescopic rod and a 1st adapting piece; one end of the 4th driving member is hinged to the base; one end of the 5th driving member is hinged to the base; the 2nd telescopic rod can be telescopically coupled to the 4th driving member, and the extension end stretches out from the other end of the 4th driving member; the 3rd telescopic rod can be telescopically coupled to the driving member, and the extension end stretches out from the other end of the 5th driving member; one side of the 1st adapting piece is hinged to the extension end of the 2nd and the 3rd telescopic rods; the other side of the 1st adapting piece is coupled to the driving unit.

4. The multi-leg independent mobile carrier device of claim 1, wherein the travelling mechanism further comprising:
    wheels located on one side of the driving unit and are drivingly coupled to the driving unit.

5. The multi-leg independent mobile carrier device of claim 1, wherein the posture adjustment mechanism comprising:
    a 1st bracket firmly fixed to the base;
    a 3rd supporting assembly which rotatably coupled to the 1st bracket.

6. The multi-leg independent mobile carrier device of claim 5, wherein:
    said travelling mechanism consists of three wheels, two of which are rotatably coupled to opposite sides of the base and are drivingly connected to the driving unit respectively; the 3rd supporting assembly comprises of a 6th driving member which rotatably coupled to the 1st bracket; a 7th driving member coupled to the 6th driving member and a 4th telescopic rod telescopically coupled to the 7th driving member with one end stretching out the 7th driving member; the remaining wheel is rotatably coupled to the extension end of the 4th telescopic rod.

7. The multi-leg independent mobile carrier device of claim 6, wherein the posture adjustment mechanism comprising:
    a lifting component setting inside the 1st bracket and flexibly coupled to the 6th driving member.

8. The multi-leg independent mobile carrier device of claim 5, wherein:
    said travelling mechanism consists of wheels of integral multiple of two; the integral multiple is greater than one time; the wheels of integral multiple of two are rotatably coupled to two opposite sides of the base in symmetry; the wheels are drivingly coupled to the driving unit; the multi-leg independent mobile carrier device consists of a loading table for carrying a person or object; the 3rd supporting assembly consists of the 6th driving member which rotatably coupled to the 1st bracket; the 6th driving member is coupled to the loading table.

9. The multi-leg independent mobile carrier device of claim 1, wherein the driving unit comprising:
    a 8th driving member for driving the connecting rod unit to move;
    a steering member coupled to the 8th drive member; the steering member is to change the advancing direction of the multi-leg independent mobile carrier device.

10. The multi-leg independent mobile carrier device of claim 9, wherein the connecting rod unit comprising:
    a connecting rod group with feet contacting the ground or the stepped surface at the end; the connecting rod group consists of several connecting rods which rotatably coupled to one side of the 8th driving member without interference on overlapping.

11. The multi-leg independent mobile carrier device of claim 9, wherein the connecting rod unit comprising:
   a connecting rod group with feet contacting the ground or the stepped surface at the end; the connecting rod group consists of several connecting rods which rotatably coupled to two opposite sides of the 8th driving member without interference on overlapping.

12. The multi-leg independent mobile carrier device of claim 10, wherein the connecting rod unit comprising:
   a connecting shaft group for connecting the connecting rod group and the 8th driving member; the connecting shaft group consists of a 1st connecting shaft connecting the 8th driving member and the connecting rod, and a 2nd connecting shaft connecting two adjacent said connecting rods.

13. The multi-leg independent mobile carrier device of claim 12, wherein:
   central axes of the 1st and the 2nd connecting shafts are coincident or in parallel or at certain angle.

14. The multi-leg independent mobile carrier device of claim 1, wherein the multi-leg independent mobile carrier device comprising:
   a detecting mechanism comprising a 2nd bracket setting at the front side of the base, a length detecting device for measuring step length, and a height detecting device for measuring step height; one end of the 2nd bracket is flexibly coupled to the base; the other end of the 2nd bracket is connected to the length detecting device and the height detecting device.

15. The multi-leg independent mobile carrier device of claim 14, wherein the detecting mechanism comprising:
   a coupling component for making the 2nd bracket rotate and stretch relative to the base; one end of the coupling component is firmly coupled to the base; and the other end of the coupling component is firmly coupled to the 2nd bracket.

16. The multi-leg independent mobile carrier device of claim 11, wherein the connecting rod unit comprising:
   a connecting shaft group for connecting the connecting rod group and the 8th driving member; the connecting shaft group consists of a 1st connecting shaft connecting the 8th driving member and the connecting rod, and a 2nd connecting shaft connecting two adjacent said connecting rods.

* * * * *